United States Patent
Wagner et al.

(10) Patent No.: US 10,080,418 B2
(45) Date of Patent: Sep. 25, 2018

(54) SYSTEM MODULE WHICH CAN BE CARRIED ON THE BACK AND HAS A CARRYING ARRANGEMENT AND A FOLD-DOWN HIP PORTION

(71) Applicant: Andreas Stihl AG & Co. KG, Waiblingen (DE)

(72) Inventors: Daniel Wagner, Winterbach (DE); Patrick Behringer, Ostfildern (DE); Markus Zeller, Schwaebisch Gmuend (DE); Martin Lambe, Kernen im Remstal (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 211 days.

(21) Appl. No.: 15/061,950

(22) Filed: Mar. 4, 2016

(65) Prior Publication Data
US 2016/0255942 A1 Sep. 8, 2016

(30) Foreign Application Priority Data
Mar. 4, 2015 (DE) .......... 10 2015 002 724

(51) Int. Cl.
*A45F 3/02* (2006.01)
*B25F 5/00* (2006.01)
(52) U.S. Cl.
CPC .......... *A45F 3/02* (2013.01); *B25F 5/00* (2013.01); *A45F 2003/025* (2013.01)

(58) Field of Classification Search
CPC ........ A45F 3/02; A45F 2003/025; A45F 3/04; A45F 3/08; A45F 3/10; A45F 3/047; A45F 13/025; B25F 5/00
See application file for complete search history.

(56) References Cited

U.S. PATENT DOCUMENTS

| | | | | |
|---|---|---|---|---|
| 4,154,381 A * | 5/1979 | Zufich | .......... | A45F 3/08 224/262 |
| 4,214,685 A * | 7/1980 | Pletz | .......... | A45F 3/04 224/634 |
| 5,211,321 A | 5/1993 | Rodriguez | | |
| 6,840,419 B2 * | 1/2005 | Penny | .......... | A45F 3/047 224/631 |
| 9,854,897 B1 | 1/2018 | Pelkey, Jr. et al. | | |
| 2008/0251550 A1 | 10/2008 | Tong | | |

(Continued)

FOREIGN PATENT DOCUMENTS

DE 196 08 794 A1 9/1997
DE 10 2004 001 551 A1 8/2005
(Continued)

*Primary Examiner* — Corey Skurdal
(74) *Attorney, Agent, or Firm* — Walter Ottesen, P.A.

(57) ABSTRACT

The invention relates to a system module, which is carried on the back, for a work tool. The system module has a stand surface for setting down the system module in an upright manner. A carrying arrangement for the system module has at least one back panel and at least one shoulder strap. The back panel is formed with an upper shoulder portion and with a lower back portion. The back panel is extended beyond the back portion by a hip portion. The hip portion can be pivoted relative to the back portion about a movement axis. The movement axis extends at the level of the stand surface of the system module.

12 Claims, 5 Drawing Sheets

(56) References Cited

U.S. PATENT DOCUMENTS

| | | |
|---|---|---|
| 2009/0279810 A1 | 11/2009 | Nobles |
| 2012/0262109 A1 | 10/2012 | Toya et al. |
| 2013/0162055 A1 | 6/2013 | Reber et al. |
| 2014/0011061 A1 | 1/2014 | Yoshinari et al. |
| 2015/0041512 A1* | 2/2015 | Rief .................... H01M 2/1005 224/633 |
| 2015/0188332 A1 | 7/2015 | Nakano et al. |
| 2016/0249730 A1* | 9/2016 | Maguire ................ A45F 3/10 224/272 |

FOREIGN PATENT DOCUMENTS

| | | |
|---|---|---|
| DE | 10 2010 038 699 A1 | 2/2012 |
| EP | 1 769 699 A1 | 4/2007 |
| FR | 2 984 700 A1 | 6/2013 |

\* cited by examiner

SYSTEM MODULE WHICH CAN BE CARRIED ON THE BACK AND HAS A CARRYING ARRANGEMENT AND A FOLD-DOWN HIP PORTION

CROSS REFERENCE TO RELATED APPLICATION

This application claims priority of German patent application no. 10 2015 002 724.7, filed Mar. 4, 2015, the entire content of which is incorporated herein by reference.

FIELD OF THE INVENTION

The invention relates to a system module, which is carried on the back, for a work tool, having a stand surface for setting down the system module in an upright manner.

BACKGROUND OF THE INVENTION

A system module carried on the back is known from United States patent application publication 2013/0162055. This known system module is configured as a battery pack with a battery-pack housing and provides the power supply of an electrical work tool which is connected to the battery pack via a connection line. Rechargeable battery cells are accommodated in the battery-pack housing, wherein the battery-pack housing has a base with a stand surface. The stand surface of the battery-pack housing generally forms a stand surface of the system module carried on the back, it being possible for the system module to be set down on the ground in an upright manner via the stand surface. The carrying arrangement for the system module has at least one back panel and two shoulder straps, wherein the back panel is formed with an upper shoulder portion and with a lower back portion. A shoulder strap provided on the carrying arrangement is secured by an upper end in the upper shoulder portion of the back panel and by a lower end in the region of the lower back portion of the back panel.

SUMMARY OF THE INVENTION

It is an object of the invention to develop a system module carried on the back in such a way that, on the one hand, uniform load transfer to a user's back is achieved and, on the other hand, the system module, together with its carrying arrangement, can be reliably set down on the ground in an upright position via its stand surface.

The back panel is extended beyond the back portion by a hip portion, with the result that the carrying forces can also be transferred to a user's hips via the hip portion. Good load distribution of the weight of the system module to a user's back is obtained. Moreover, the hip portion ensures a further fixing of the system module to a user's back without restricting the user's freedom of movement.

The hip portion provided as an extension on the back portion is pivotable relative to the back portion about a movement axis, wherein the movement axis extends between the back portion and the hip portion in the region of the level of the stand surface of the system module. The moveable attachment of the hip portion to the back portion has the advantage that the hip portion can be folded down. This is always advantageous when the stand surface of the system module has to be set down in an upright manner onto a bench, the ground or another flat surface. The hip portion does not impede the upright setting down of the system module together with the carrying arrangement.

The movement axis preferably runs parallel to the plane of the stand surface. The movement axis is expediently covered by the system module itself. This ensures that a movement of the hip portion about the movement axis is possible essentially in only one pivoting direction. In the direction of the system module it is possible to fold down the hip portion only to a limited degree since, through the covering by the system module, the hip portion is supported by the module. In the opposite direction, it is possible for the hip portion to be folded up away from the system module with a large pivoting angle, wherein, on account of the covering of the movement axis by the system module, the folded-up hip portion is situated somewhat higher than the stand surface. The hip portion can thus be pivoted through up to 90° and more about the movement axis beyond the plane of the stand surface, wherein, in the carrying position, the hip portion projects beyond the stand surface of the system module and, in a pivoted position, the hip portion is situated above the plane of the stand surface of the system module.

In a preferred embodiment, the movement axis is formed by a textile hinge, expediently by an elastic woven fabric.

The hip portion can be closed by a hip strap, with the result that the hip portion can be fixed securely to the user's hips.

It may be advantageous to protect the system module from moisture and dirt. This is expedient for example when the system module is formed by a battery pack. A cover which can be fastened to the back panel is expediently provided. The cover is advantageously open at the lower end adjacent to the hip portion; the stand surface of the system module is located in the open end of the cover, with the result that the cover does not impede the upright setting-down of the system module and advantageously, moreover, the cover cannot be damaged by ground contact.

The cover advantageously is made of a water-repellent, flexible material. In order to prevent the ingress of moisture such as rainwater under the cover, the cover is fastened to the back panel via a releaseable, water-repellent closure.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
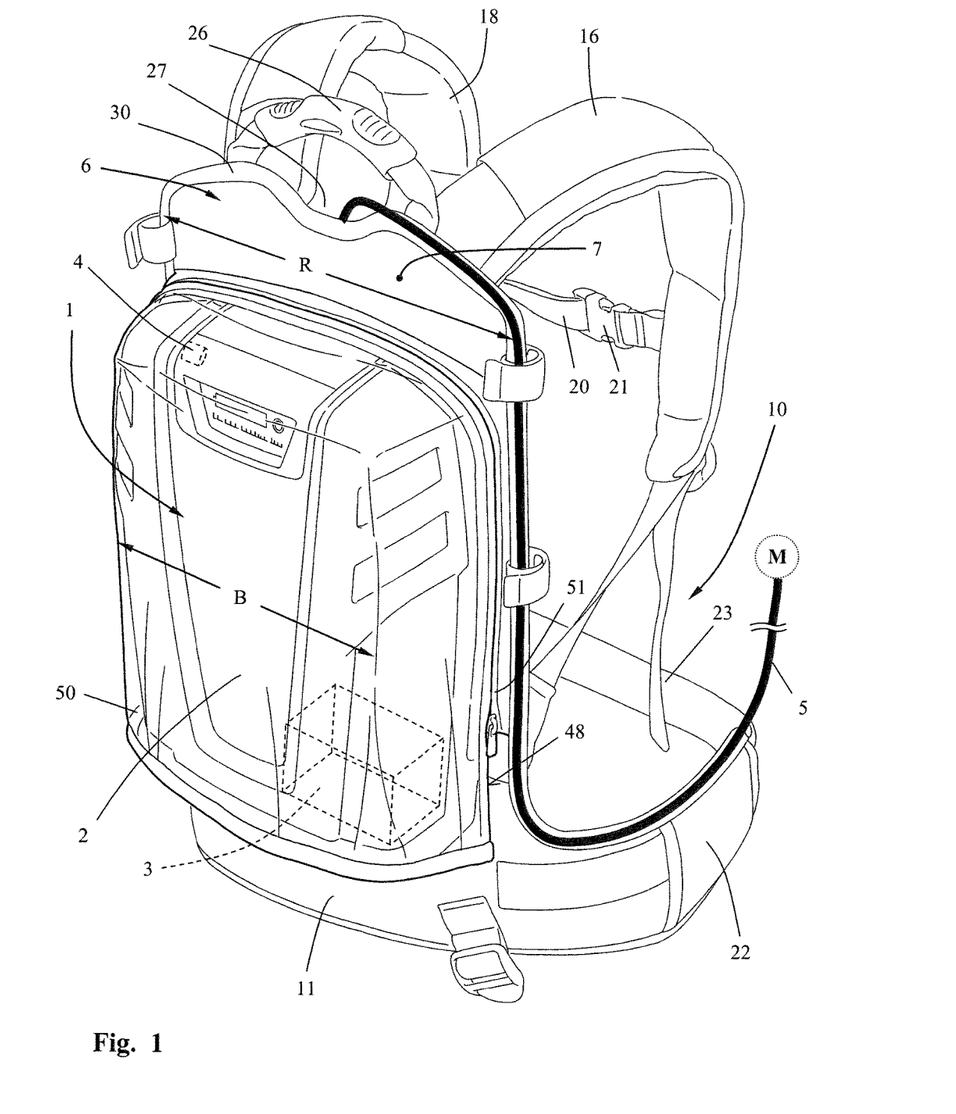
FIG. 1 is a perspective view showing a system module in the form of a battery pack having a carrying arrangement to be carried on the back of a user (not shown)

The system module 1, which is carried on the back and is illustrated in the embodiment according to FIGS. 1 to 4, is configured as a battery pack with a battery-pack housing 2 in which—as indicated by dashed lines—an arrangement of rechargeable battery cells 3 is provided. The arrangement of the battery cells 3 has, in a connection box, a common electrical connection 4 to which a line 5 to an external electric load M is connected. As shown in FIG. 1, the line 5 can be guided along the outer edge 30 of the carrying arrangement, the line expediently being fixed to the outer edge 30 via fasteners 35. In the embodiment shown, the system module 1 is fixedly connected to the back panel 6 of a carrying arrangement 10; it may be practical for the back panel 6 to be formed in one piece with the system module 1.

Figure 2:
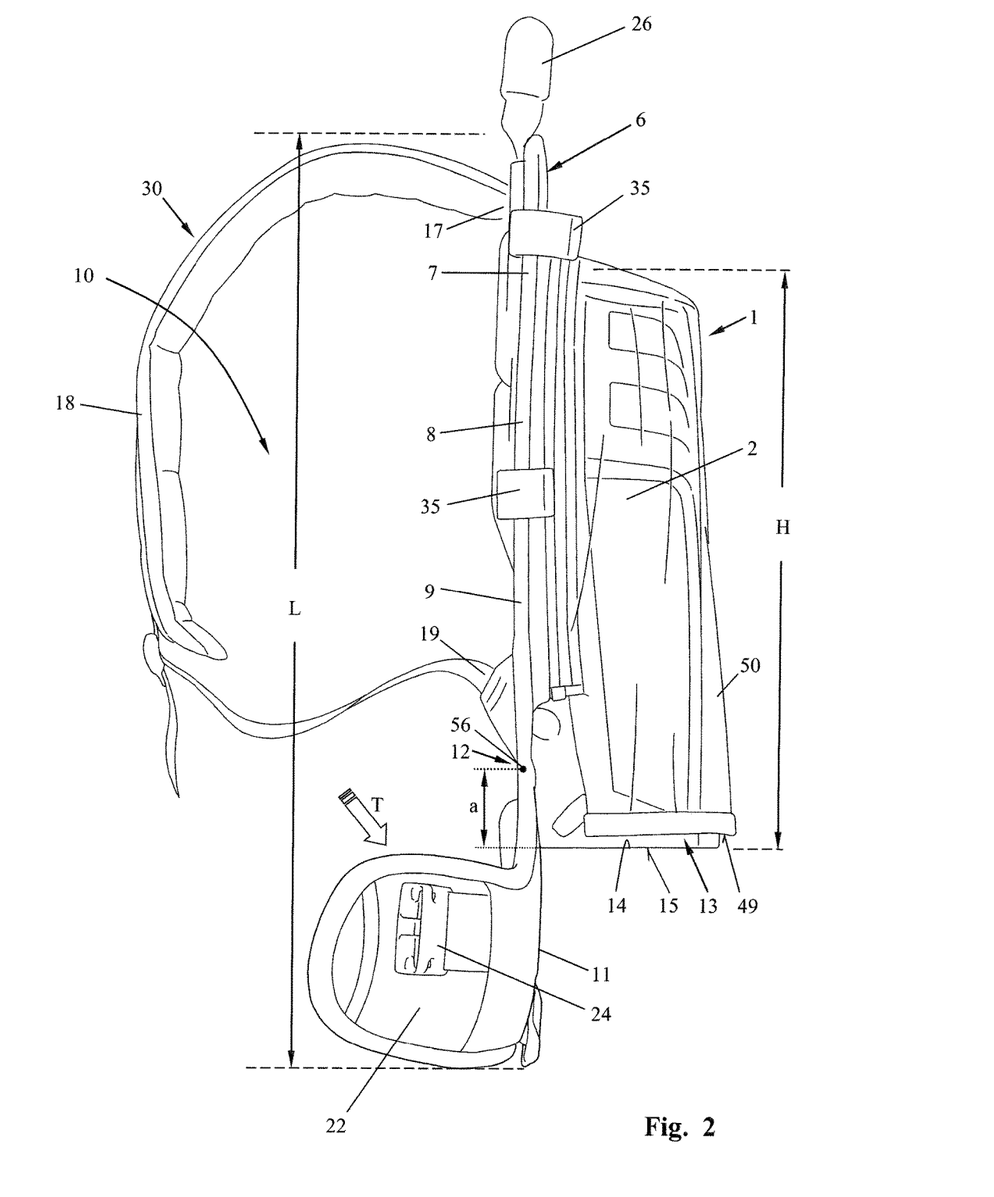
FIG. 2 is a side view of the system module with the carrying arrangement.

As shown in FIG. 2, the back panel 6 extends in the vertical direction from an upper shoulder portion 7, via a center portion 8, to a lower back portion 9. As is further shown in FIGS. 1 to 5, in the embodiment, the back panel 6 is extended beyond the back portion 9 by a hip portion 11. The hip portion 11 expediently extends from the back portion 9 via a textile hinge, preferably via an elastic woven-fabric portion 12, with the result that the hip portion 11 is moveable relative to the back panel 6 or its back portion 9 about a movement axis 56. The pivotable attachment of the hip portion 11 to the back portion 9 can also be achieved in some other way, for example via a joint or the like.

Figure 3:
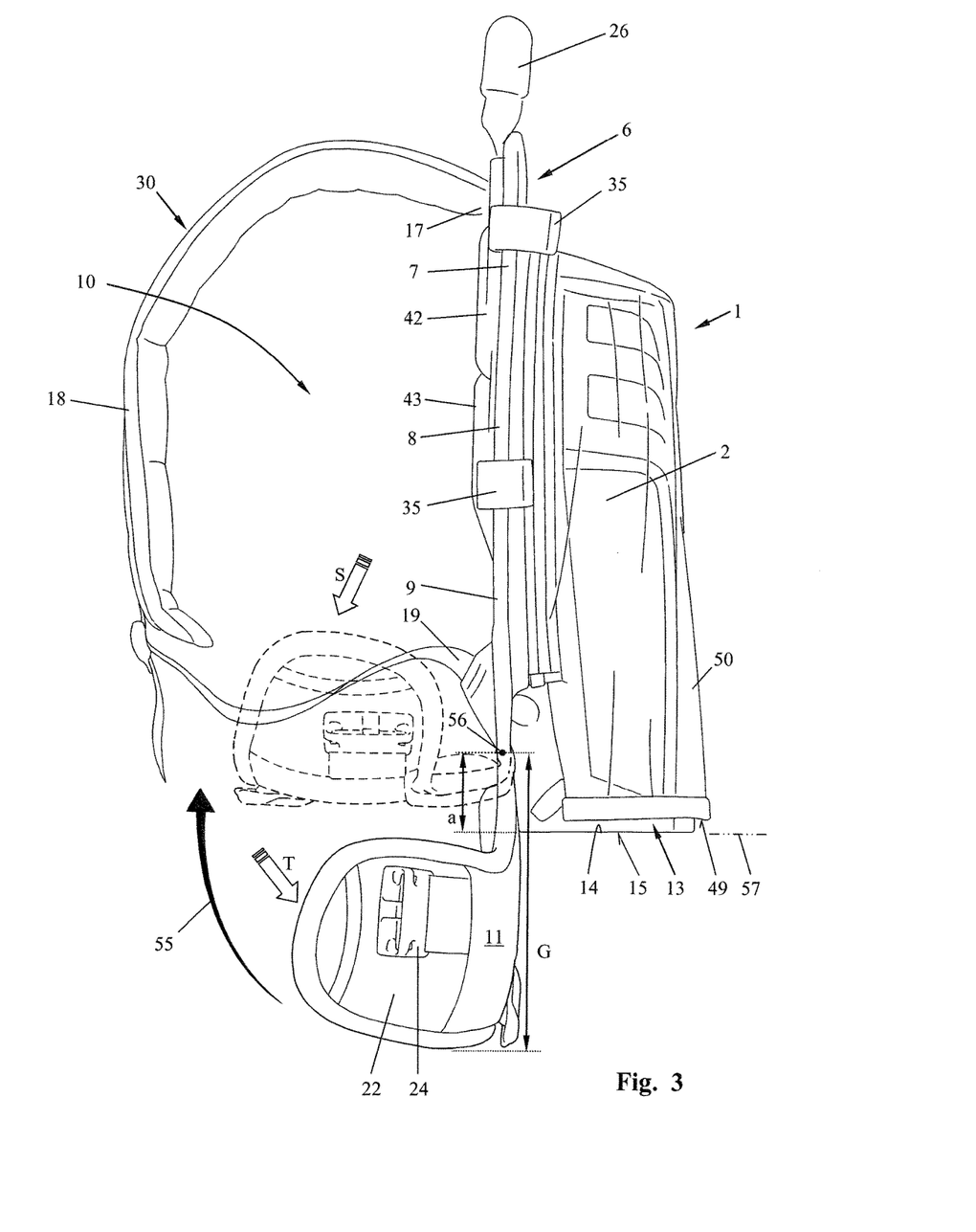
FIG. 3 is a side view of the system module with the carrying arrangement according to FIG. 2 with a hip portion shown in the carrying position and with a pivoted-in hip portion indicated by dashed lines.

As shown in FIG. 2, the system module 1 has a height H which extends from the shoulder portion 7 over the center portion 8 and the back portion 9 and into the hip portion 11. FIGS. 1 and 3 show that the shoulder portion 7 projects upwardly beyond the system module 1; correspondingly, the hip portion 11 projects beyond the lower end 13 of the system module 1.

The lower end 13 of the system module 1 can be configured in such a way that the system module 1 forms an outer, preferably planar stand surface 15. Alternatively, it may be advantageous to fit stand feet (41, 42) as shown for example in FIG. 6. As shown in FIG. 2, the movement axis 56 is situated in the region of the stand surface 15, expediently at a distance (a) above the stand surface 15 of the system module 1. The movement axis 56 is situated at a greater distance from the ground 60 than the stand surface 15. The textile hinge or the woven-fabric portion 12 is expediently situated at a distance (a) above the stand surface 15. In the embodiment shown, the stand surface 15 of the system module 1 is formed on the base 14 of the battery-pack housing 2.

The width R (FIG. 1) of the back panel 6 is slightly wider than the width B of the system module 1, preferably 1 to 5 cm wider than the width B of the system module 1; the height L (FIG. 2) of the back panel 6 is greater than the height H of the system module 1; the height L of the back panel 6 is approximately 30% to 70% longer than the height H of the system module 1.

The carrying arrangement 10 for the system module 1 carried on the back includes at least one shoulder strap (16, 18) which is secured by its upper end 17 in the region of the upper shoulder portion 7 of the back panel 6. The lower end 19 of the shoulder strap (16, 18) is fastened in the region of the lower back portion 9 of the back panel 6. In the embodiment shown, two shoulder straps (16, 18) are provided.

The shoulder straps (16, 18) can be connected to one another via a chest strap 20; the chest strap 20 runs transversely from the center of the one shoulder strap 16 to the other shoulder strap 18 and can be opened and closed via a lock 21.

The hip portion 11 of the back panel 6 has two lateral hip flaps 22 which can be closed at the level of a user's hips via a connecting strap 23 and a lock 24.

The shoulder straps (16, 18), the chest strap 20 and the connecting strap 23 also have adjusting arrangements for adaptation of the length of the straps. In order to make it possible for the system module 1 together with the carrying arrangement 10 to be carried easily by hand, a handle loop 26 is secured in the upper region of the shoulder portion 7. In the region of the handle loop 26, the upper outer edge 30 of the back panel 6 has a central concavity 27.

As shown in FIGS. 1 to 4, the system module 1 fastened on the back panel 6 is covered by a cover 50. The cover 50 engages over the system module 1 substantially over the entire height H; only the end 49 of the cover 50 that is adjacent to the back portion 9 is open.

The cover 50 is made of a water-repellent, flexible material and is secured by an edge 48 to the back panel 6. The embodiment shows a releasable, water-repellent closure 51 between the cover 50 and the back panel 6; this closure is expediently configured as a zip, in particular as a watertight zip.

Figure 5:
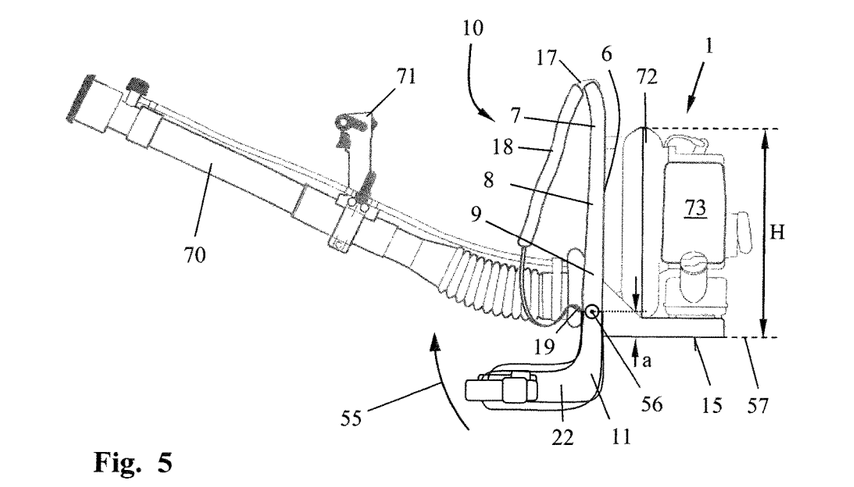
FIG. 5 is a schematic side view of a system module in the form of a drive unit of a blower; and, FIG. 6 is a schematic side view of a system module according to FIG. 5 with a stand surface defined by stand feet.

As explained above, the system module 1 has a stand surface 15 via which the system module 1 can be set down on a ground surface 60 (FIG. 5). The stand surface 15 is configured in such a way that the system module 1, together with the carrying arrangement 10, reliably stands upright on the ground.

The back panel 6 extends beyond the back portion 9 by a hip portion 11 and is configured in such a way that the hip portion 11, together with its side flaps 22, can be pivoted about the movement axis 56 in arrow direction 55. The woven-fabric portion 12 here forms a textile hinge and the movement axis 56 about which the hip portion 11 is pivotable relative to the back portion 9.

As shown in FIGS. 2 and 3, the movement axis 56 is situated at a distance (a) above the stand surface 15. With a view of the battery-pack housing 2 from behind, the movement axis 56 is covered by the system module 1.

The movement axis 56 runs parallel to the plane 57 of the stand surface 15. It is sufficient for the movement axis 56 to extend approximately at the level of the stand surface 15 of the system module 1.

From the carrying position T according to FIG. 2 the hip portion 11 can be pivoted in arrow direction 55 (FIG. 3) about the movement axis 56 into the pivoted position S; counter to arrow direction 55, the hip portion 11 is supported in the carrying position T against the system module 1. Stable support is achieved if the distance (a) is selected to be sufficiently large; in the embodiment shown, the distance (a) is approximately 10% to 30% of the height G of the hip portion 11.

Figure 4:
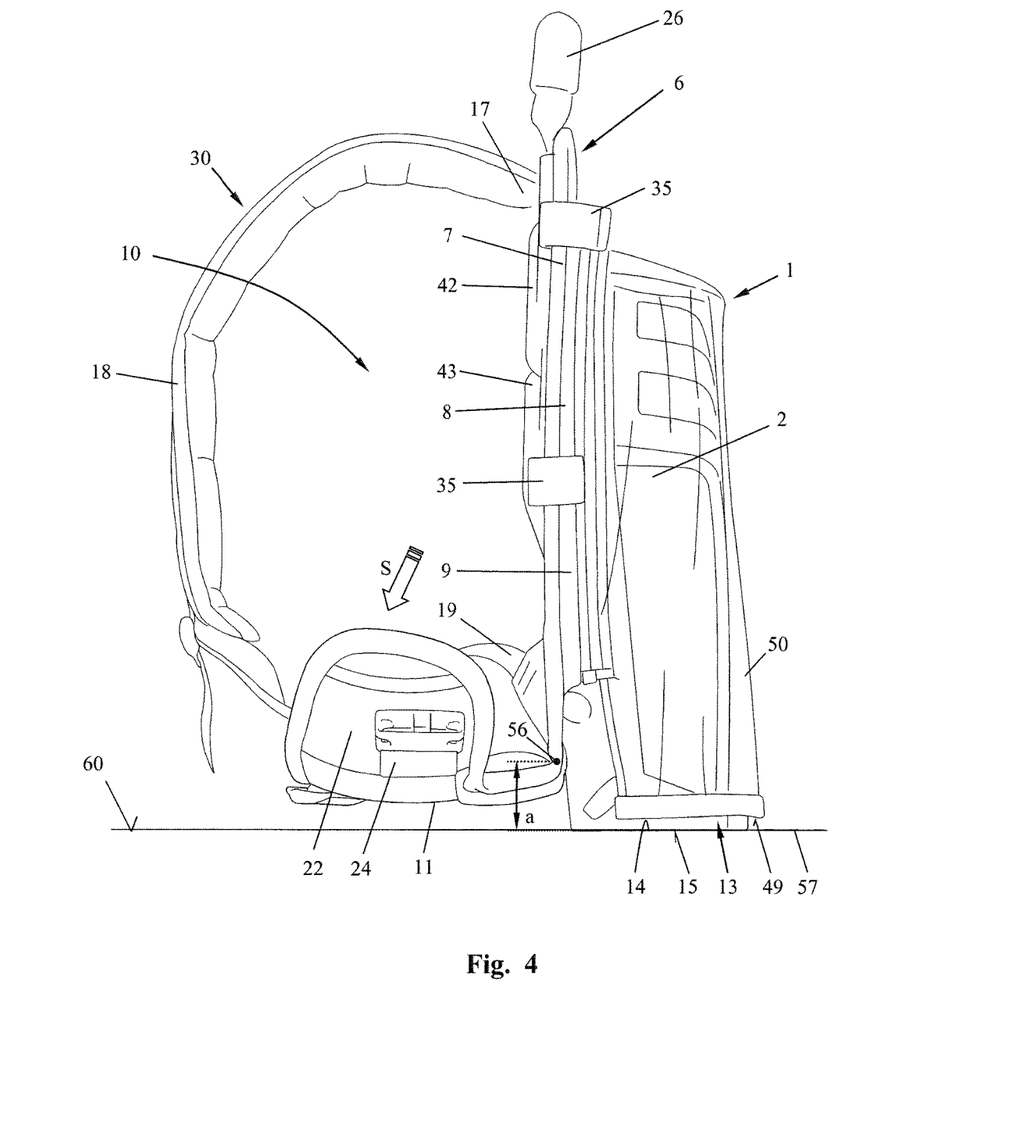
FIG. 4 is a side view of a system module set down on the ground with a pivoted-in hip portion.

In arrow direction 55, the hip portion 11 can be moved out of the carrying position T beyond the plane 57 of the stand surface 15 through approximately 90° into the pivoted position S. In this pivoted position S—as a result of the distance (a) between the movement axis 56 and the stand surface 15—the hip portion 11 is situated above the plane 57 of the stand surface 15. Consequently—as shown in FIG. 4—the system module 1, together with the carrying arrangement 10, can be reliably set down on the ground 60 without the hip portion 11 getting in the way. Owing to the distance (a) between the movement axis 56 and the stand surface 15, it is also ensured that the hip portion 11, which can be pivoted into the pivoted position S, is situated at a distance from the ground 60 in the pivoted position S. It is ensured that the system module 1 together with the carrying arrangement 10 stands reliably and upright on the ground 60.

The embodiment according to FIG. 5 shows a system module 1 in the form of a blower having a blower volute 72 and a drive unit 73. Connected to the blower volute 72 is a blowing tube 70 which is guided and held by the user via an operating handle 71. As described above using the example of a battery pack as a system module 1, a carrying arrangement 10 is connected to the system module 1 and substantially includes a back panel 6. As also described in relation to the embodiment according to FIGS. 1 to 4, the back panel 6 includes a shoulder portion 7, a center portion 8 and a back portion 9, wherein the back panel 6 extends beyond the back portion 9 by a hip portion 11.

The hip portion 11 is attached by a joint defining a movement axis 56, wherein the movement axis 56 is situated approximately parallel to the stand surface 15 of the system module 1. The movement axis 56 is at a distance (a) from the stand surface 15, as has already been explained in detail with reference to FIGS. 1 to 4. The fold-down function of the hip portion 11 corresponds to the above description in relation to FIGS. 1 to 4.

Figure 6:
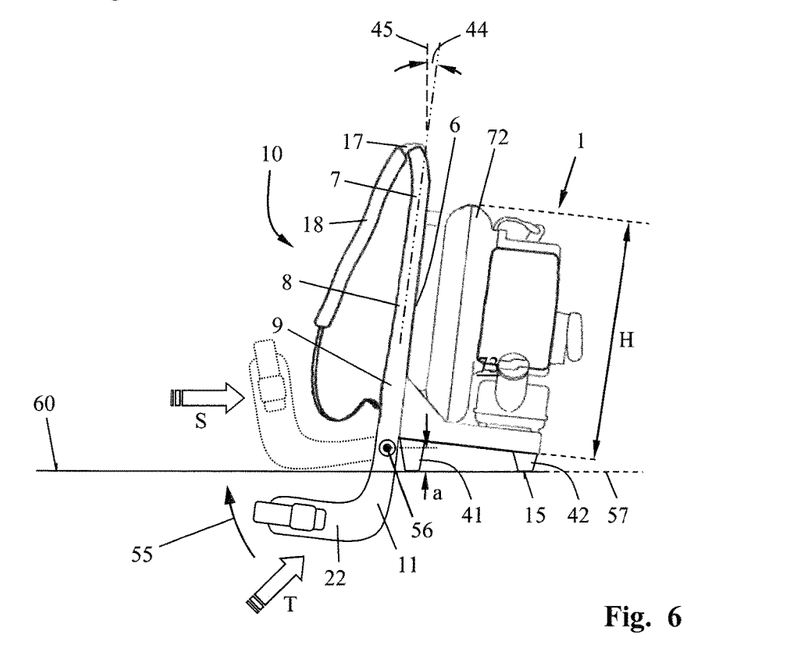

The embodiment of a system module 1 according to FIG. 6 corresponds to the system module 1 according to FIG. 5, for which reason identical reference characters are used for identical parts. The system module 1 according to FIG. 6 has a stand surface 15 for setting the system module 1 down on the ground 60. The stand surface 15 is formed by stand feet (41, 42) which can be fastened to the base of the system module and whose support surfaces on the ground 60 define the plane 57 of the stand surface 15. As a result, the system module 1 can be set down on the ground 60 at an angle 44 to the vertical 45, thereby making it easier for a user to pick up the system module 1 again.

It is understood that the foregoing description is that of the preferred embodiments of the invention and that various changes and modifications may be made thereto without departing from the spirit and scope of the invention as defined in the appended claims.

What is claimed is:

1. A system module for a work tool, the system module being configured to be carried on the back of a user; the system module comprising:
   a stand surface configured to enable the system module to stand upright;
   a carrying arrangement configured for the system module and having at least one back panel and a shoulder strap;
   the system module being fixed on said back panel of said carrying arrangement in such a manner that said back panel projects downwardly beyond said stand surface;
   said back panel having an upper shoulder section; a lower hip section and a middle back section;
   said middle back section being disposed between said upper shoulder section and said lower hip section;
   said upper shoulder section, said middle back section and said lower hip section conjointly forming said back panel;
   said lower hip section being an extension of said back panel beyond said middle back section;
   said shoulder strap having a top end fixed to said upper shoulder section and a bottom end fixed to said middle back section;
   said middle back section and said lower hip section conjointly defining an interface whereat said lower hip section of said back panel is freely pivotable relative to said middle back section of said back panel about a movement axis;
   said movement axis of said lower hip section being disposed so as to extend in the region of said stand surface of the system module; and,
   said lower hip section being pivotable about said pivot axis beyond said stand surface.

2. The system module of claim 1, wherein the system module is a battery pack.

3. The system module of claim 2, wherein the system module covers said movement axis.

4. The system module of claim 1, wherein:
   said stand surface defines a plane; and,
   said movement axis extends parallel to said plane.

5. The system module of claim 1, wherein:
   the battery pack defines a carried position (T);
   said lower hip section extends beyond said stand surface when the battery pack is in said carried position (T); and,
   said lower hip section defines a pivot position (S) at which said lower hip section is disposed above said stand surface.

6. The system module of claim 1 further comprising a hip belt configured to close said lower hip section.

7. The system module of claim 1, wherein said back panel is formed as a one-piece component.

8. A system module for a work tool, the system module being configured to be carried on the back of a user; the system module comprising:
   a stand surface configured to enable the system module to stand upright;
   a carrying arrangement configured for the system module and having at least one back panel and a shoulder strap;
   said back panel having an upper shoulder section and a lower back section;
   said shoulder strap having a top end fixed to said upper shoulder section and a bottom end fixed to said lower back section;
   said back panel further having a hip section configured as an extension beyond said back section;
   said back section and said hip section conjointly defining an interface whereat said hip section is pivotable relative to said back section about a movement axis;
   said movement axis being disposed so as to extend in the region of said stand surface of the system module;
   wherein the system module is a battery pack; and, wherein said movement axis is formed by an elastic woven fabric.

9. A system module for a work tool, the system module being configured to be carried on the back of a user; the system module comprising:
   a stand surface configured to enable the system module to stand upright;
   a carrying arrangement configured for the system module and having at least one back panel and a shoulder strap;
   said back panel having an upper shoulder section and a lower back section;
   said shoulder strap having a top end fixed to said upper shoulder section and a bottom end fixed to said lower back section;
   said back panel further having a hip section configured as an extension beyond said back section;
   said back section and said hip section conjointly defining an interface whereat said hip section is pivotable relative to said back section about a movement axis;
   said movement axis being disposed so as to extend in the region of said stand surface of the system module;

the system module being a battery pack; and, a cover fixed on said back panel and configured to accommodate the system module.

10. The system module of claim 9, wherein said cover has a lower end disposed adjacent to said hip section and said cover is open at said lower end.

11. The system module of claim 9, wherein said cover is made of a water-repellent flexible material.

12. The system module of claim 9 further comprising a releasable, water-repellent fastener configured to fix said cover to said back panel.

* * * * *